United States Patent [19]

Cooper

[11] Patent Number: 5,229,448
[45] Date of Patent: Jul. 20, 1993

[54] FORMATION OF FILLED MOLDING POWDERS OF POLYBENZIMIDAZOLE AND OTHER POLYMERS

[75] Inventor: William M. Cooper, Clinton, N.J.

[73] Assignee: Hoechst Celanese Corp., Somerville, Del.

[21] Appl. No.: 713,942

[22] Filed: Jun. 12, 1991

[51] Int. Cl.⁵ .......................... C08K 3/38; C08K 3/34; C08J 3/00
[52] U.S. Cl. .................................... 524/404; 524/424; 524/492; 524/494; 524/701; 524/789; 523/1; 523/333
[58] Field of Search .................... 523/1, 333; 524/789, 524/424, 701, 404, 492, 494

[56] References Cited

U.S. PATENT DOCUMENTS

| | | | |
|---|---|---|---|
| 2,695,425 | 11/1954 | Stott | 524/602 |
| 3,215,663 | 11/1965 | Weisberg | 523/333 |
| 3,755,244 | 8/1973 | Hart | 523/333 |
| 4,289,685 | 9/1981 | Druschke et al. | 523/333 |
| 4,379,871 | 4/1983 | Werle et al. | 523/333 |

*Primary Examiner*—Kriellion S. Morgan
*Attorney, Agent, or Firm*—Joseph M. Mazzarese

[57] ABSTRACT

A process for making filled molding powders by preparing a dilute solution of a polymer, making a slurry of a filler in the polymer solution, and then causing the polymer to come out of solution, e.g. by adding a non-solvent or by solvent evaporation, so that the polymer coats the filler particles.

18 Claims, No Drawings

FORMATION OF FILLED MOLDING POWDERS OF POLYBENZIMIDAZOLE AND OTHER POLYMERS

BACKGROUND OF THE INVENTION

This invention relates to a process for the production of filled molding powders of polymers, particularly to such a process wherein the powder includes polybenzimidazole ("PBI") or another thermally intractable polymer.

Polymers are used to make a multitude of products, including a wide variety of molded articles. These molded articles often must have specific attributes that may not be provided by unfilled polymers. In such cases, it may be desirable to use polymers filled with materials such as graphite powder, chopped glass, mica flakes, carbon fibers, glass fibers, metallic powders, or other fillers. The filler may advantageously alter the mechanical or thermal properties of the polymer. Filled polymers also may be used to reduce costs, or for other reasons.

A variety of filled polymers are known in the art. For example, polyesters may be filled with talc or hollow glass spheres to improve thermal or mechanical properties, thermoplastics may be filled with metallic powders to produce thermally or electrically conductive articles, and ground silica may be used in polyurethanes to form potting compounds having favorable dielectric properties. See: *Encyclopedia of Polymer Science and Engineering*, Mark, Bikales, Overberger, & Menges, Eds., 2d Ed., Vol. 7, pp. 53–73, John Wiley & Sons, Inc., 1987.

Generally, the polymer to be filled is one that is easily melt processable so that it will readily flow around the filler particles during molding to produce an article having a relatively uniform composition. The ability of such polymers to completely surround the filler material minimizes potentially detrimental voids and heterogenous areas within the article.

Thermally intractable or infusible polymers such as PBI are not amenable to melt processing with filler materials. Although these polymers generally may be hot-pressed or cold-pressed and sintered by compression molding techniques, it is difficult to use these polymers to make filled molded articles because the polymer does not melt and flow around the filler particles.

U.S. Pat. No. 2,639,278 describes a method for producing finely divided nylon particles by precipitating the polymer from solution. U.S. Pat. No. 2,695,425 describes a method for making sintered nylon products using a powder made according to the teaching of the '278 patent.

SUMMARY OF THE INVENTION

The present invention is a process for making filled molding powders comprising preparation of a slurry of filler in a dilute solution of polymer followed by precipitation of the polymer. The polymer coats the filler particles as it precipitates. Precipitation may be induced by combining the slurry with water or other liquid immiscible with the polymer solvent during agitation, or by other means.

Generally, the water may be poured into the slurry, or vice versa; however, where the filler is a fiber, it is usually necessary to pour the water into the slurry because the slurry will not pour readily. The resultant filled powder may be molded by conventional means.

The preferred filler is an insoluble inorganic material in the form of powder, fiber, flakes, beads, or other particles, or a combination thereof. The filler preferably comprises at least about 5% by weight of the filled powder, and more preferably about 5–20%. If less than about 5% is used, the filler may not sufficiently modify the polymer's properties.

It is an object of the present invention to provide a process for making a moldable filled polymer powder.

It is also an object of the present invention to provide a process for intimately combining a thermally intractable polymer with filler.

It is another object of this invention to provide a process for making a moldable filled PBI powder.

It is a further object of the present invention to provide a moldable filled polymer powder and articles made therefrom.

These and other objects of the present invention will be apparent to those skilled in the art from the description of the invention contained herein.

DETAILED DESCRIPTION OF THE PREFERRED EMBODIMENTS

In one embodiment of the present invention, a 7.5% PBI solution in N,N-dimethylacetamide ("DMAC") is prepared and a sufficient amount of boron nitride ("BN") is added to produce a slurry having a weight ratio of PBI:BN in the range of between about 95:5 and about 25:75. The slurry is slowly poured into a vessel containing a large amount water while the water is being agitated, e.g. in a blender. DMAC is miscible with water, but PBI is insoluble in water, so the PBI precipitates as the slurry mixes with the water. The filler particles act as nuclei for polymer precipitation, resulting in the formation of boron nitride filled PBI powder or flakes.

In another embodiment of the present invention, the water may be added to the slurry while the slurry is being agitated, again causing the PBI to precipitate. The same filled polymer particles result. This method is preferred where the filler is a fiber that forms a slurry that does not pour readily.

Other methods known in the art may be used to cause the polymer to leave solution and coat the filler particles in the practice of this invention, such as solvent evaporation (preferably by application of a vacuum). Whatever method is chosen, the polymer must come out of solution in the presence of the filler to form a filled polymer according to this invention.

Where precipitation is accomplished by combining a nonsolvent (e.g., water in the above embodiments) with the polymer solution, the nonsolvent chosen will depend on the solubility characteristics of the polymer, the filler, and the solvent. Those skilled in the art will readily be able to select an appropriate nonsolvent.

The present invention will work for almost any type of polymer and filler material, provided that the polymer can be dissolved in a solvent in which the filler is not soluble. Those skilled in the art will know how to select an appropriate solvent for a given polymer and filler.

The filler preferably comprises at least about 5% by weight of the filled powder, most preferably about 5–20%. If less than about 5% is used, the filler may not sufficiently modify the polymer's properties. A powder having a high percentage of filler, i.e. 50–75% or more, may be made according to the present invention and later blended with unfilled polymer to reduce the amount of filler. This approach is particularly convenient when commercial products having varying levels of filler content are to be produced, or when reducing shipping weight is important. By making such a concentrated masterbatch, it may be possible to minimize the size of the equipment used in the practice of this invention.

Examples of fillers useful in the present invention include chopped glass, glass beads, carbon fibers, graphite powder, silicon carbide whiskers, boron nitride powder, and the like. More generally, preferred fillers include insoluble inorganic fibers, powders, and other particles. Typically, the filler particles have a mean diameter no greater than about 3-6 mm; most powders and fibers have much smaller mean diameters. In general, smaller particles blend with the polymer more thoroughly and homogeneously, and are preferable to large particles in the practice of this invention.

The invention will find particular use for filling thermally intractable polymers, i.e. polymers that do not exhibit a conventional melting point and, therefore, cannot easily be melt molded. One example is the class of polymers called polybenzimidazoles.

The preferred polybenzimidazole, poly[2,2'-(m-phenylene)-5,5'-bibenzimidazole], is commercially available from the Hoechst Celanese Corporation (Charlotte, N.C.). Polybenzimidazoles are a class of linear polymers having repeat units containing the benzimidazole moiety:

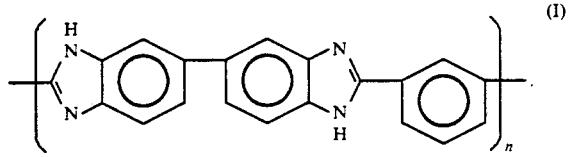
(I)

These compounds are nonflammable and may be formed into fibers, films, and membranes having outstanding thermal, physical, and chemical stability. Processes for their production are disclosed, for example, in U.S. Pat. No. Re. 26,065 and U.S. Pat. Nos. 3,313,783, 3,509,108, 3,555,389, 3,433,772, 3,408,336, 3,549,603, 3,708,439, 4,154,919, and 4,312,976, the disclosures of which are herein incorporated by reference.

Polybenzimidazoles are prepared conventionally by the condensation of tetraamino compounds with dicarboxylic acids (or esters or halide salts thereof). For example, poly[2,2'-(m-phenylene)-5,5'-bibenzimidazole] may be prepared by reacting diphenyl isophthalate with 3,3',4,4'-tetraaminobiphenyl:

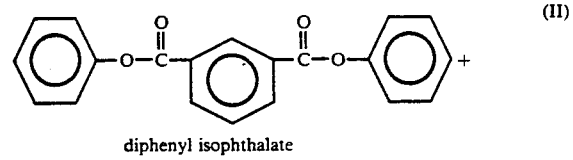
(II)
diphenyl isophthalate

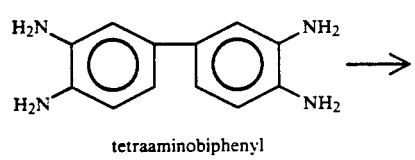
tetraaminobiphenyl

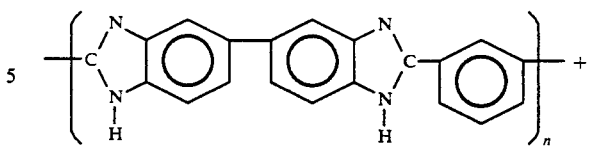
poly[2,2'(m-phenylene)-5,5'-bibenzimidazole]

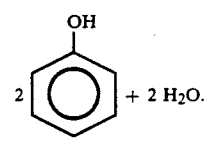
$+ 2 H_2O$.

More generally, U.S. Pat. No. 2,895,948 teaches the following condensation reaction for making polybenzimidazole:

$HOOC(CH_2)_n-COOH\ +$ (III)

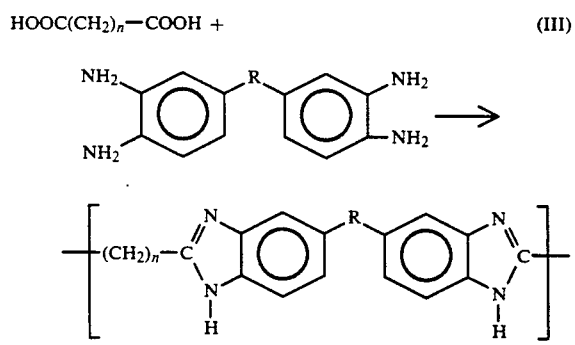

wherein R is a group selected from the class consisting of diphenyl bonds and divalent radicals, and n is an integer from 4 to 8. Other examples of conventional processes are disclosed in U.S. Pats. No. 4,814,530, 4,431,796, and 4,414,383.

The polymerization of PBI may be accomplished in several ways, such as in polyphosphoric acid or a hot molten nonsolvent such as sulfolane or diphenyl sulfone. Melt solid state polymerization is the commercially practical route.

Other thermally intractable polymers that may be used in the process of this invention include polyimides, polybenzoxazoles, 6-T nylon (polymer product of terephthalic acid and 1,6-hexanediamine monomers), and the like.

Although the desired product of the process of the present invention is referred to herein as a filled powder, the invention should not be deemed limited to forming a particle having a particular size or shape; the term "powder" in this context refers broadly to any particles formed by the process of this invention, whether in the form of flakes, beads, fine powders, nodules, or other particles.

The following Examples are presented for the purpose of illustrating the invention; however, it is understood that the invention is not limited to the embodiments illustrated.

EXAMPLE I

A solution of 7.5% PBI in DMAC was prepared from 85 grams DMAC and 35.5 grams of 26.5% 0.70-0.75 poly[2,2'-(m-phenylene)-5,5'-bibenzimidazole] IV plant dope. This solution was combined with 27.5 grams of BN to form a slurry.

Half of the slurry prepared above was poured carefully into a Waring blender containing 500 ml distilled water with the blender turned on. The agitation from the blender was sufficient to vortex the water to the impeller prior to the addition of the slurry. The PBI precipitated as it entered the water. The PBI-BN solid was filtered and washed three times in the blender using 1000 ml hot distilled water. The wash liquid was decanted after each of the first two washings and filtered after the last washing, leaving a wet filled polymer cake. The cake was dried in a vacuum oven at 150° C. and then pulverized to obtain a 75% BN-filled PBI powder.

EXAMPLE II

A BN-PBI slurry was prepared as in Example I and put in an empty Waring blender. The blender was turned on and 1000 ml of distilled water was added slowly to precipitate the PBI. The resulting cake was washed, dried and pulverized as in Example I, with the same results.

EXAMPLE III

A BN-PBI slurry was prepared as in Example I and vacuum dried at 150° C. to remove the polymer solvent, causing the PBI to coat onto the filler particles. The resulting particles were washed, dried and pulverized as in Example I. Once again, a 75% BN-filled PBI powder was obtained.

Many variations of the present invention will be apparent to those skilled in the art from the above description and the appended claims. The present invention includes all variations within the scope of the appended claims.

I claim:

1. A process for making a moldable filled polymer comprising the steps of:
   dissolving a polymer in a solvent to form a polymer solution, said polymer being chosen from the group consisting of polybenzimidazoles, polyimides, polybenzoxazoles, 6-T nylon, and combinations thereof;
   mixing a filler with said polymer solution to form a slurry of filler and polymer solution; and,
   precipitating said polymer from said solution within said slurry to form filled polymer particles by combining said slurry with a nonsolvent which is miscible with said solvent and which causes said polymer to precipitate.

2. A process according to claim 1 wherein said nonsolvent is poured into said slurry while said slurry is being agitated.

3. A process according to claim 1, wherein said slurry is poured into said nonsolvent while said nonsolvent is being agitated.

4. A process according to claim 1 further comprising the step of drying said filled polymer after precipitation.

5. A process according to claim 1 wherein the weight ratio of said filler to said polymer in said slurry is between about 5:95 and about 75:25.

6. A process according to claim 1 wherein the weight ratio of said filler to said polymer in said slurry is between about 5:95 and about 20:80.

7. A process according to claim 1 wherein said polymer is a polybenzimidazole.

8. A process according to claim 1 wherein said filler comprises insoluble inorganic particles in the form of powder, flakes, fiber, beads, or a combination thereof.

9. A process according to claim 1 wherein said filler is selected from the group consisting of chopped glass, glass beads, carbon fibers, graphite powder, silicon carbide whiskers, boron nitride powder, and combinations thereof.

10. A filled polymer made according to the process of claim 1.

11. A filled polymer according to claim 10 wherein said polymer comprises a polybenzimidazole.

12. A filled polymer according to claim 10 wherein said filler comprises at least about 5% by weight of said filled polymer.

13. A filled polymer according to claim 10 wherein said polymer comprises between about 80% and about 95% by weight of said filled polymer.

14. A process for making a moldable filled polymer comprising the steps of:
   dissolving a polymer in a solvent to form a polymer solution, said polymer being chosen from the group consisting of polybenzimidazoles, polyimides, polybenzoxazoles, 6-T nylon, and combinations thereof;
   mixing an insoluble inorganic filler with said polymer solution to form a slurry of filler and polymer solution, the weight ratio of said filler to said polymer being in the approximate range of from 5:95 to 75:25; and,
   precipitating said polymer from said solution within said slurry to form filled polymer particles by combining said slurry with a nonsolvent which is miscible with said solvent and which causes said polymer to precipitate.

15. A process according to claim 14 wherein said polymer is a polybenzimidazole.

16. A process according to claim 14 wherein said filler is selected from the group consisting of chopped glass, glass beads, carbon fibers, graphite powder, silicon carbide whiskers, boron nitride powder, and combinations thereof.

17. A filled polymer made according to the process of claim 16.

18. A filled polymer made according to the process of claim 17.

* * * * *